Figures 1, 2, 3, 4:
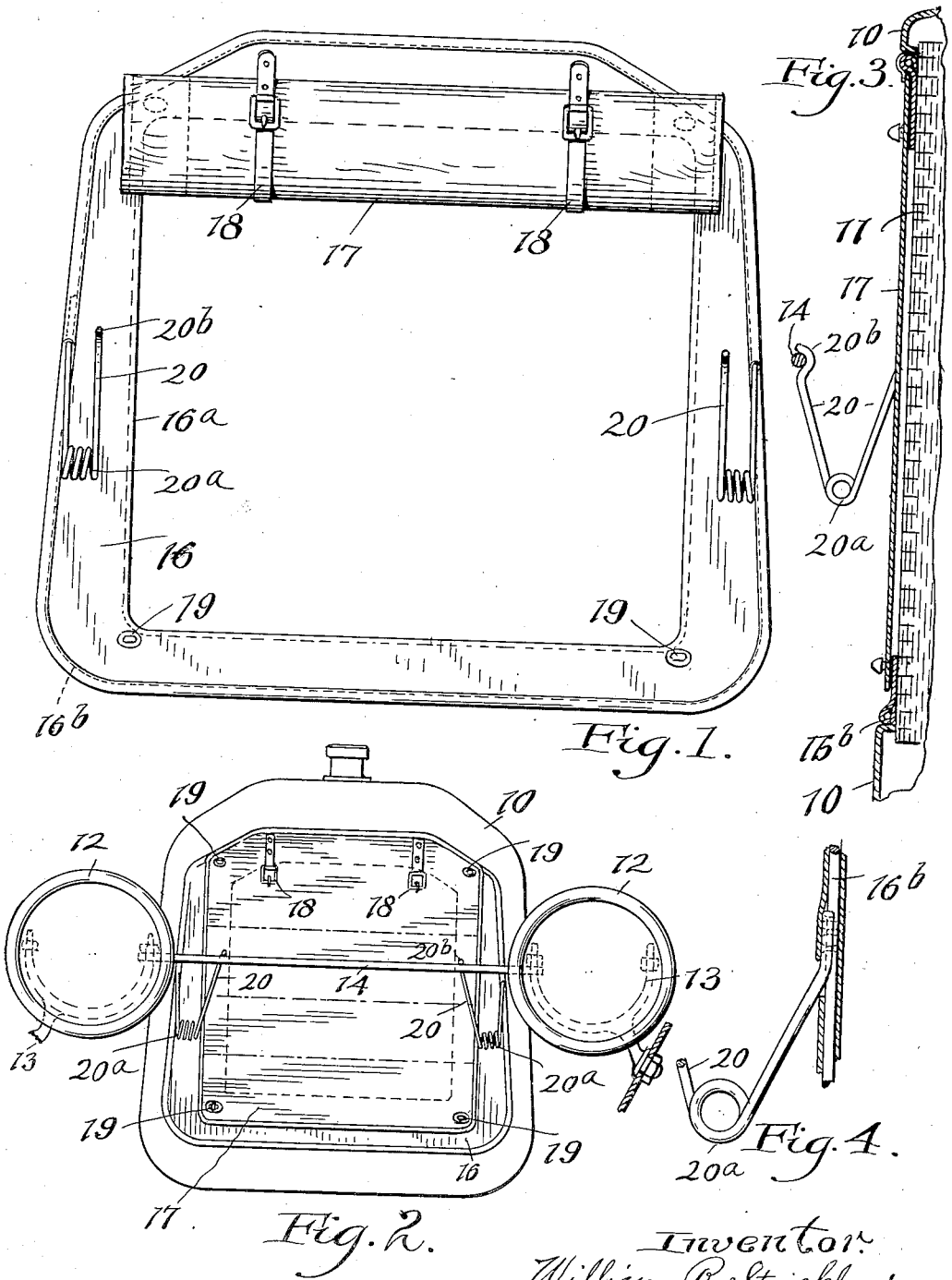

W. R. STRICKLAND.
RADIATOR CLOSURE.
APPLICATION FILED FEB. 15, 1918.

1,371,402.

Patented Mar. 15, 1921.

Inventor
William R Strickland
By Thurston & Rivers
attys

UNITED STATES PATENT OFFICE.

WILLIAM R. STRICKLAND, OF CLEVELAND, OHIO, ASSIGNOR TO THE PEERLESS MOTOR CAR COMPANY, OF CLEVELAND, OHIO, A CORPORATION OF OHIO.

RADIATOR-CLOSURE.

1,371,402.     Specification of Letters Patent.     Patented Mar. 15, 1921.

Application filed February 15, 1918. Serial No. 217,353.

*To all whom it may concern:*

Be it known that I, WILLIAM R. STRICKLAND, a citizen of the United States, residing at Cleveland, in the county of Cuyahoga and State of Ohio, have invented a certain new and useful Improvement in Radiator-Closures, of which the following is a full, clear, and exact description.

This invention relates to radiator closures for automobiles, and has for its object to provide a closure, particularly of the drop curtain type, which can be applied to the front of an automobile radiator and securely held in position, or removed when removal is desired, readily and quickly and without marring the radiator shell.

In carrying out my invention I provide a closure, preferably comprising an outside frame and a drop curtain, which closure is designed to be seated in the inset or recess within the radiator shell and in front of the honeycomb section of the radiator, and to be held in position by spring arms bearing against the usual cross rod between the lamp brackets of the automobile.

The invention may be further briefly summarized as consisting in certain novel details of construction and combinations and arrangements of parts which will be described in the specification and set forth in the appended claims.

In the accompanying sheet of drawings, Figure 1 is a front view of the closure with the curtain raised; Fig. 2 is a front view of the automobile with the radiator closure applied thereto, the curtain being lowered; Fig. 3 is an enlarged vertical sectional view illustrating the manner in which the closure is seated and held in position; and Fig. 4 is a detail view showing the manner in which the spring arms are attached to the frame of the closure.

In the drawings wherein I have shown the preferred form of my invention, 10 represents the radiator shell, and 11 the so-called honeycomb section thereof through which air normally passes to cool the water of the engine cooling system, this honeycomb section of the radiator being inset somewhat from the shell, forming a shallow recess which is utilized in the manner hereinafter described. The usual automobile construction includes also, front lamps 12, lamp brackets 13, and the horizontal cross rod 14, extending between the lamp brackets in front of the radiator. All these parts are of standard construction of many well-known makes of automobiles.

Normally it is of course desired that the front section of the radiator be open so that air can be drawn therethrough to cool the water of the water cooled internal combustion engine of the automobile. In cold weather, however, particularly during, and for a time after starting, it is desirable that the front of the radiator be closed until the engine is warmed up and is operating smoothly, and in extreme cold weather it is often desired that the radiator be kept closed unless the engine is operated under severe load conditions. It is therefore customary for automobile manufacturers or users to provide, and attach in some manner or other to the radiator, a cover or curtain which can be rolled up so as to leave the radiator open, or can be dropped to keep it closed. The major portion of the devices, and in fact, all the devices of this character of which I am aware, have not been easy to apply or remove from the radiator, and it is generally the case that fastening devices were required, which marred the radiator shell.

In carrying out my invention I provide a closure which corresponds in size and outline to the exposed honeycomb section of the radiator, this closure comprising an outer frame 16, adapted to fit snugly inside the front bead of the radiator shell, that is to say, in the front inset or recessed part of the radiator, this frame being preferably formed of leather 16ᵃ with a leather covered stiffening rod 16ᵇ of the proper outline or configuration extending about its perimeter. The frame has a rectangular shaped opening which is designed to be covered by a drop curtain 17, which can be folded or rolled up and held in that condition by straps 18, or other suitable means so as to leave the major portion of the honeycomb section of the radiator open for the passage of air, or it can be dropped so as to fully close the front of the radiator, suitable fastening devices 19 being preferably provided to hold the curtain in its lower closed position, and to admit of its removal entirely from the frame.

For the purpose of holding the closure in place in the inset part of the radiator, and at the same time to provide an efficient holding means which will admit of the quick removal of the closure from, or its attachment to the front of the automobile without requiring fastening devices which mar the radiator shell, or any other part of the automobile, I provide means for securely holding this closure in place through spring clamping means carried by the closure so as to engage the cross rod 14 of the lamp brackets.

Although other forms of clamping devices than here shown may be employed, I prefer to form them in the shape of spring arms 20 which are secured to the leather covered rod at the perimeter of the closure near the center of the upright portions thereof, which arms extend downwardly as shown, are then coiled as shown at 20$^a$ so as to provide elasticity or spring, and then extend upwardly, their upper ends being formed hook-shaped as shown at 20$^b$, so as to engage over and bear forcibly against the cross rod 14.

It has been found in practice that with these spring arms engaging the cross rod as shown and described, the radiator closure is securely held in position and is not displaced, even though the automobile is run over rough roads. Furthermore, the closure can be placed in position quickly, and as quickly removed from the automobile, and this is done without in any way marring or disfiguring the radiator shell.

It will be obvious that it is immaterial to the effectiveness of the spring arm clamping means, whether there is some variation in the spacing of the cross rod from the radiator, and should there be a variation in the height of the cross rod, the hook-shaped upper ends of the spring arm can be made to properly engage the cross rod by bending these arms inwardly, slightly, as shown in Fig. 2.

I do not desire to be confined to the exact details shown, but aim in my claims to cover all modifications which do not involve a departure from the spirit and scope of my invention.

Having described my invention, what I claim is:

1. The combination with an automobile having a radiator with a normally open section, of a closure for the open section, and means for holding the closure in position at the front of the radiator comprising clamps extending between the closure and a part of the automobile structure, and serving to positively press the closure against the front of the radiator.

2. In combination with an automobile having a radiator composed of a shell and an open section, and a rod extending across the automobile in front of the radiator, of a closure for the open section of the radiator, and means extending between said closure and the rod for holding the closure in place.

3. The combination with an automobile having a radiator composed of a shell and an open section, and a cross rod in front of the radiator, of a closure for the open part of the radiator, and means for holding the closure in place comprising clamping arms extending from the closure and bearing against the cross rod.

4. The combination with an automobile having a radiator with an open section for the passage of air, and having a cross rod in front of the radiator, of a closure for the open section of the radiator, said closure comprising a frame of substantially the outline of the open section of the radiator, and a drop curtain by which the latter may be closed, and spring arms extending from the frame and at their free ends engaging the cross rod.

5. The combination with an automobile having a radiator composed of a shell and an inset open section for the passage of air, forming a recess, of a radiator closure seated in said recess, and retaining means for the closure consisting of clamps extending between the closure and the automobile structure and serving to press the closure into said recess.

6. The combination with an automobile having a radiator composed of a shell and an inset open portion for the passage of air, and having a cross rod extending in front of the radiator, of a closure of substantially the outline of the inset open portion of the radiator, said closure fitting into the inset, and spring clamping means extending between the closure and said cross rod.

7. A closure for the open end of an automobile radiator comprising a frame having a drop curtain and provided with forwardly projecting spring clamp members adapted to engage the automobile structure and thereby press the closure against the front of the radiator.

8. A closure for the open section of an automobile radiator comprising a frame having a wire or rod extending about its perimeter, and having a drop curtain, spring clamp arms secured to said wire or rod and projecting forwardly therefrom and adapted to engage a part of the automobile to hold the closure in place.

In testimony whereof, I hereunto affix my signature.

WILLIAM R. STRICKLAND.